(12) United States Patent
Velazquez Alcantar et al.

(10) Patent No.: US 11,878,674 B2
(45) Date of Patent: Jan. 23, 2024

(54) ESTIMATION OF VEHICLE SPEED IN ALL-WHEEL-DRIVE VEHICLE

(71) Applicant: FORD GLOBAL TECHNOLOGIES, LLC, Dearborn, MI (US)

(72) Inventors: Jose Velazquez Alcantar, Canton, MI (US); Joseph Jay Torres, Dearborn, MI (US); Peter James Barrette, Jupiter, FL (US); Richard David Bruns, Milford, MI (US); Corwin Stout, Redwood City, CA (US); Rajit Johri, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/165,575

(22) Filed: Feb. 7, 2023

(65) Prior Publication Data
US 2023/0192064 A1   Jun. 22, 2023

Related U.S. Application Data

(62) Division of application No. 16/155,282, filed on Oct. 9, 2018, now Pat. No. 11,584,352.

(51) Int. Cl.
*B60W 20/10* (2016.01)
*B60K 6/52* (2007.10)
(Continued)

(52) U.S. Cl.
CPC ............. *B60W 20/10* (2013.01); *B60K 6/52* (2013.01); *B60L 15/38* (2013.01); *B60T 8/172* (2013.01);
(Continued)

(58) Field of Classification Search
CPC .......... B60W 20/10; B60W 30/18172; B60W 2510/081; B60W 2520/10;
(Continued)

(56) References Cited

U.S. PATENT DOCUMENTS

| | | | |
|---|---|---|---|
| 4,982,348 A | | 1/1991 | Matsuda et al. |
| 5,132,907 A | * | 7/1992 | Ishikawa ................. B60T 8/172 702/148 |

(Continued)

FOREIGN PATENT DOCUMENTS

| | | |
|---|---|---|
| DE | 102009002360 A1 | 10/2010 |
| WO | 2018007535 A1 | 1/2018 |

*Primary Examiner* — Isaac G Smith
(74) *Attorney, Agent, or Firm* — David B Kelley; Brooks Kushman P.C.

(57) ABSTRACT

A vehicle includes an all-wheel-drive powertrain having an electric machine configured to power wheels. A controller is programmed to output a first calculated vehicle speed derived from integrating a measured longitudinal acceleration of the vehicle and output a second calculated vehicle speed based on the measured longitudinal acceleration and a speed of one of the wheels. The controller is further programmed to, responsive to a flag being present, command a speed to the electric machine that is based on the first vehicle speed to reduce wheel slip, and responsive to a flag not being present, command a speed to the electric machine that is based on the second vehicle speed to reduce wheel slip.

6 Claims, 5 Drawing Sheets

(51) Int. Cl.
*B60T 8/172* (2006.01)
*B60T 8/175* (2006.01)
*B60T 8/1761* (2006.01)
*B60T 8/1769* (2006.01)
*B60L 15/38* (2006.01)
*B60W 30/18* (2012.01)

(52) U.S. Cl.
CPC ............ *B60T 8/175* (2013.01); *B60T 8/1761* (2013.01); *B60T 8/1769* (2013.01); *B60W 30/18172* (2013.01); *B60L 2240/12* (2013.01); *B60L 2240/421* (2013.01); *B60L 2240/461* (2013.01); *B60L 2240/465* (2013.01); *B60T 2270/12* (2013.01); *B60W 2510/081* (2013.01); *B60W 2520/10* (2013.01); *B60W 2520/263* (2013.01); *B60W 2520/28* (2013.01); *B60Y 2200/91* (2013.01); *B60Y 2200/92* (2013.01)

(58) Field of Classification Search
CPC ........ B60W 2520/263; B60W 2520/28; B60K 6/52; B60L 15/38; B60L 2240/12; B60L 2240/421; B60L 2240/461; B60L 2240/465; B60T 8/172; B60T 8/175; B60T 8/1761; B60T 8/1769; B60T 2270/12; B60Y 2200/91; B60Y 2200/92
USPC .......................................................... 701/22
See application file for complete search history.

(56) References Cited

U.S. PATENT DOCUMENTS

| | | |
|---|---|---|
| 5,258,914 A | 11/1993 | Schmitt |
| 7,071,642 B2 | 7/2006 | Wilton et al. |
| 7,286,909 B2 | 10/2007 | Darke |
| 7,747,363 B1 | 6/2010 | Tang |
| 8,620,546 B2 | 12/2013 | Kobayashi et al. |
| 8,880,308 B2 | 11/2014 | Dourra et al. |
| 9,311,761 B1 | 4/2016 | Ye et al. |
| 9,758,167 B1 | 9/2017 | Pandit et al. |
| 9,878,721 B2 | 1/2018 | Singh et al. |
| 2013/0274969 A1* | 10/2013 | Wang .................... B60W 20/00 903/946 |

\* cited by examiner

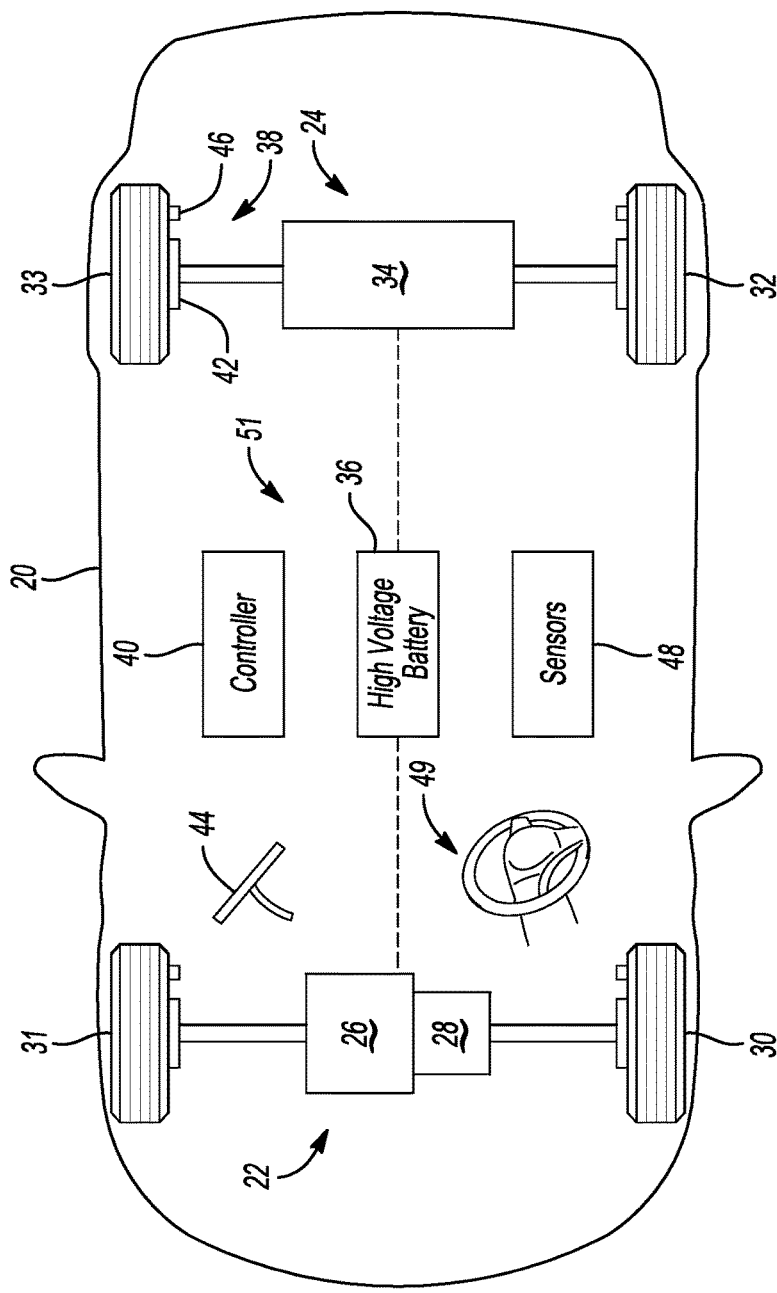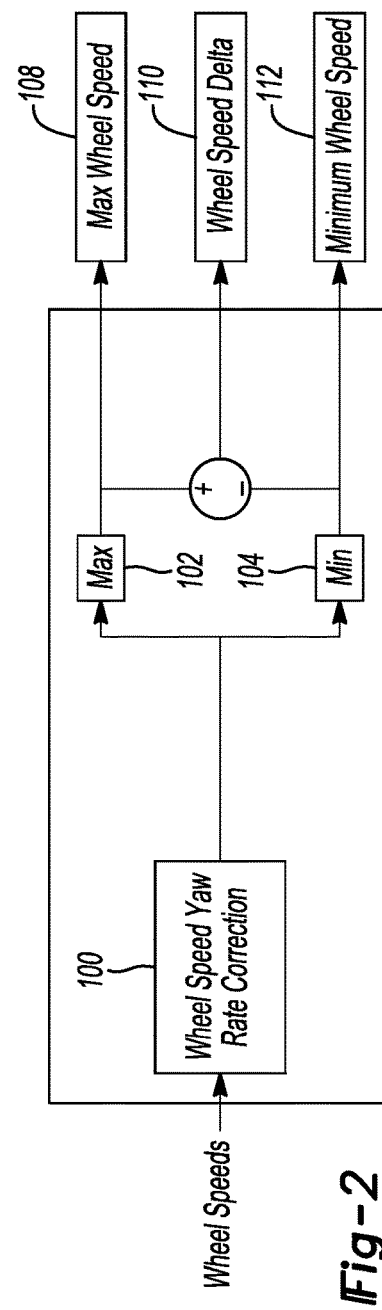

ESTIMATION OF VEHICLE SPEED IN ALL-WHEEL-DRIVE VEHICLE

CROSS-REFERENCE TO RELATED APPLICATIONS

This application is a division of U.S. application Ser. No. 16/155,282 filed Oct. 9, 2018, now U.S. Pat. No. 11,584,352, issued Feb. 21, 2023, the disclosure of which is hereby incorporated in its entirety by reference herein.

TECHNICAL FIELD

This disclosure relates to electrified vehicles that include all-wheel drive, and more specifically to calculating vehicle speed that compensates for road grade.

BACKGROUND

Electrified vehicles, such as fully electric and hybrid electric vehicles, include at least one electric machine for propelling the vehicle. The electric machine is powered by a traction battery that supplies energy to the electric machine, which reduces a state of charge (SOC) of the battery. Many electrified vehicles are capable of regenerative braking to recharge the battery by converting mechanical power into electrical power.

SUMMARY

According to one embodiment, a vehicle includes an electric machine and a controller. The controller is programmed to responsive to a threshold difference, indicative of wheel slip, between average wheel speed and a vehicle speed that is based on a difference between wheel acceleration and measured vehicle acceleration, command a speed to the electric machine to reduce the wheel slip.

According to another embodiment, a method of controlling a vehicle includes commanding torque to an electric machine. The method further includes, responsive to a threshold difference, indicative of wheel slip, between average wheel speed and a vehicle speed that is based on a difference between wheel acceleration and measured vehicle acceleration, commanding a speed to the electric machine such that a product of the average wheel speed and wheel rolling radius converges toward the vehicle speed to reduce the wheel slip.

According to yet another embodiment, a vehicle includes an all-wheel-drive powertrain having an electric machine configured to power wheels and a controller. The controller is programmed to output a first calculated vehicle speed derived from integrating a measured longitudinal acceleration of the vehicle, and output a second calculated vehicle speed based on the measured longitudinal acceleration and a speed of one of the wheels. The controller is further programmed to, responsive to a flag being present, command a speed to the electric machine that is based on the first vehicle speed to reduce wheel slip, and, responsive to a flag not being present, command a speed to the electric machine that is based on the second vehicle speed to reduce wheel slip.

BRIEF DESCRIPTION OF THE DRAWINGS

FIG. 1 is a diagrammatical view of a hybrid vehicle having front and rear drive axles.

FIG. 2 illustrates a control diagram for wheel speed signal processing of a vehicle speed estimation algorithm.

DETAILED DESCRIPTION

Figure 3:
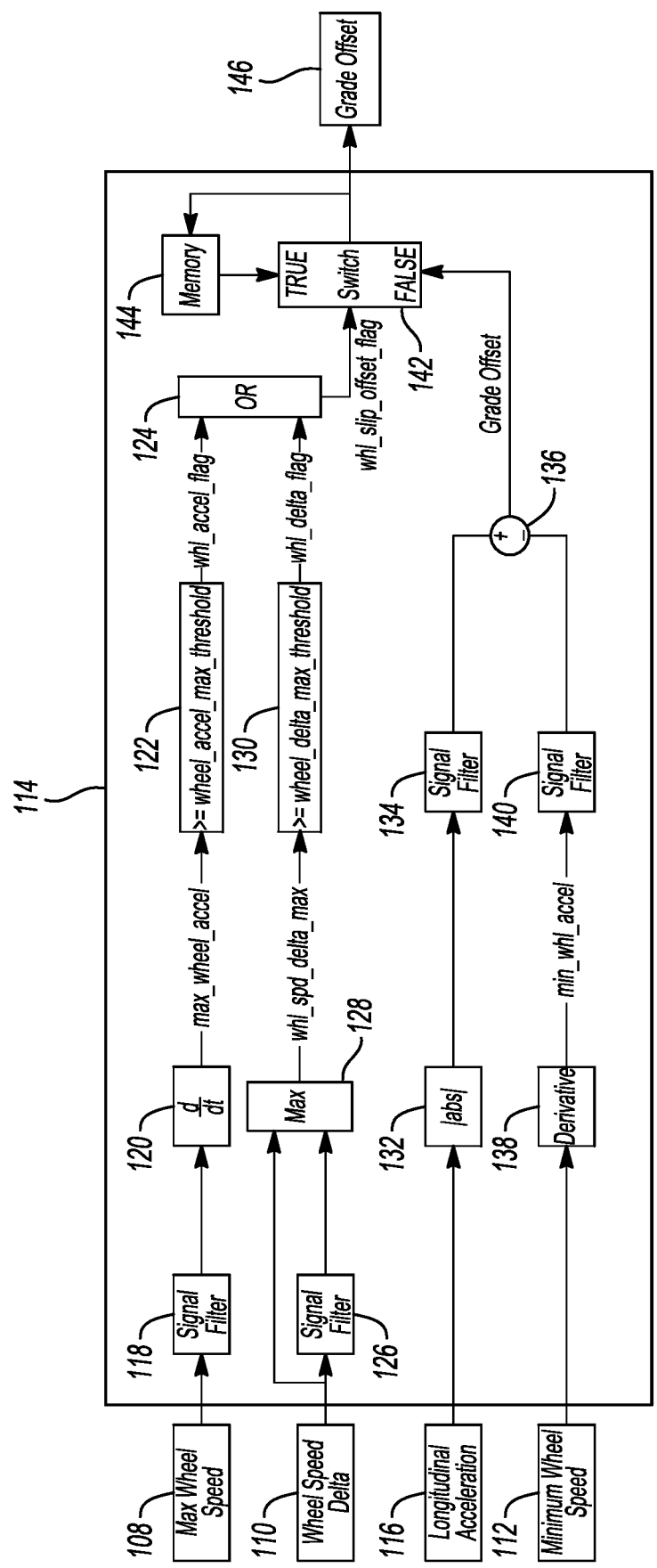
FIG. 3 illustrates a control diagram for calculating a grade offset component of the vehicle speed estimation algorithm.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to FIG. 1, an all-wheel-drive vehicle 20 is illustrated as a hybrid-electric vehicle that includes an internal-combustion engine (ICE), but, in other embodiments, the vehicle 20 may be a fully electric vehicle or a convention vehicle that only includes an ICE. The vehicle 20 includes a front drive axle 22 and a rear drive axle 24. The front and rear axles 22, 24 may share one or more powerplants (e.g., an engine and/or an electric machine) or, as illustrated, may each include their own one or more powerplants. In the illustrated embodiment, the front axle 22 is powered by the engine 26 and a first electric machine 28, and the rear axle 24 is powered by a second electric machine 34. The axles 22, 24 are capable of operating independently of each other or in tandem to accelerate (propel) or decelerate (brake) the vehicle 20.

The front drive axle 22 includes front wheels 30 and 31 that receive power from the engine 26 and the electric machine 28. The engine 26 and the electric machine 28 may operate in tandem or independently depending upon operating conditions of the vehicle. A gearbox (not shown) may be included to change a speed ratio between the wheels 30, 31 and the powerplants. The gearbox may be a multi-speed gear box.

The rear drive axle 24 includes rear wheels 32 and 33 that are powered by the electric machine 34. A gearbox (not shown) may be included to change a speed ratio between the electric machine 34 and the wheels 32, 33. The gearbox of the rear drive axle 24 may be a one-speed gearbox.

The electric machines 28, 34 are capable of acting as motors to propel the vehicle 20 and are capable of acting as generators to brake the vehicle via regenerative braking. For simplicity, the electric machines may be referred to as motors. The electric machines 28, 34 may be alternating current (AC) machines.

The electric machines 28, 34 are powered by a traction battery 36. The traction battery 36 stores energy that can be used by the electric machines 28, 34. The traction battery 36 typically provides a high-voltage direct current (DC) output from one or more battery cell arrays, sometimes referred to as battery cell stacks, within the traction battery 36. The battery cell arrays include one or more battery cells. The battery cells, such as a prismatic, pouch, cylindrical, or any other type of cell, convert stored chemical energy to electrical energy. The cells may include a housing, a positive electrode (cathode), and a negative electrode (anode). An electrolyte allows ions to move between the anode and cathode during discharge, and then return during recharge. Terminals may allow current to flow out of the cell for use by the vehicle 20. Different battery pack configurations may be available to address individual vehicle variables including packaging constraints and power requirements. The battery cells may be thermally regulated with a thermal management system.

The traction battery 36 may be electrically connected to one or more power-electronics modules through one or more contactors. The module may be electrically connected to the electric machines 28, 34 and may provide the ability to bi-directionally transfer electrical energy between the traction battery 36 and the electric machines 28, 34. For example, a typical traction battery 36 may provide a DC voltage while the electric machines 28, 34 may require a three-phase AC voltage to function. The power-electronics module may convert the DC voltage to a three-phase AC voltage as required by the electric machines. In a regenerative mode, the power-electronics module may convert the three-phase AC voltage from the electric machines 28, 34 acting as generators to the DC voltage required by the traction battery 36.

The vehicle 20 includes a controller 40 that is in electronic communication with a plurality of vehicle systems and is configured to coordinate functionality of the vehicle. The controller 40 may be a vehicle-based computing system that includes one or more controllers that communicate via a serial bus (e.g., controller area network (CAN)) or via dedicated electrical conduits. The controller 40 generally includes any number of microprocessors, ASICs, ICs, memory (e.g., FLASH, ROM, RAM, EPROM and/or EEPROM) and software code to co-act with one another to perform a series of operations. The controller 40 also includes predetermined data, or "lookup tables" that are based on calculations and test data, and are stored within the memory. The controller 40 may communicate with other vehicle systems and controllers over one or more wired or wireless vehicle connections using common bus protocols (e.g., CAN and LIN). Used herein, a reference to "a controller" refers to one or more controllers. The controller 40 may include battery energy control module (BECM) that operates at least the traction battery, an engine control module (ECM) that operates at least the engine, a powertrain control module (PCM) that operates at least the electric machines and the gearboxes, and an ABS control module that controls the anti-lock braking system (ABS) 38.

The ABS 38, while illustrated as a hydraulic system, may be electronic or a combination of electronic and a hydraulic. The ABS 38 may include a brake module and a plurality of friction brakes 42 located at each of the wheels. Modern vehicles typically have disc brakes; however, other types of friction brakes are available such as drum brakes. Each of the brakes 42 are in fluid communication with the brake module via a brake line configured to deliver fluid pressure from the module to a caliper of the brakes 42. The module may include a plurality of valves configured to provide independent fluid pressure to each of the brakes 42. The brake module may be controlled by operation of a brake pedal 44 and/or by the vehicle controller 40 without input from the driver. The ABS 38 also includes speed sensors 46 each located on one of the wheels. The speed sensors output a signal to the controller 40 indicative of an angular velocity of the wheels.

The vehicle 20 is configured to decelerate using regenerative braking, friction braking, or a combination thereof. The controller 40 includes programming for aggregating a demanded braking torque between regenerative braking, i.e., the electric machines, and the friction brakes 42. The demanded braking torque may be based on driver input, e.g., a position of the brake pedal 44, or by the controller 40. The aggregator of the controller 40 may be programmed to decelerate the vehicle using regenerative braking whenever possible and apply the friction brakes 42 only when needed.

The vehicle 20 may include one or more sensors 48 configured to determine accelerations of the vehicle. For example, the sensors 48 may include a yaw-rate sensor, a lateral-acceleration sensor, and a longitudinal-acceleration sensor. Used herein, "acceleration" refers to both positive acceleration (propulsion) and negative acceleration (braking). The yaw-rate sensor generates a yaw-rate signal corresponding to the yaw rate of the vehicle. Using the yaw rate sensor, the yaw acceleration may also be determined. The lateral-acceleration sensor outputs a lateral-acceleration signal corresponding to the lateral acceleration of the vehicle. The longitudinal-acceleration sensor generates a longitudinal-acceleration signal corresponding to the longitudinal acceleration of the vehicle. The various sensors are in communication with the controller 40. In some embodiments, the yaw rate, lateral acceleration, longitudinal acceleration, and other measurements may be measured by a single sensor.

The vehicle 20 may also include a steering system 49 that turns the front wheels 30, 31. The steering system 49 may include a steering wheel connected to a steering shaft that actuates a steering box, such as a rack-and-pinion assembly. The steering box is operably coupled to the front wheels 30, 32 and turns the wheels according to inputs from the steering wheel. The steering system 49 may include one or more sensors configured to output a signal indicative of steering angle to the controller 40. The steering sensor may measure rotation of the steering shaft.

The vehicle 20 also includes a traction control system 51 configured to reduce wheel slip as well as provide stability control of the vehicle. The traction control system may include stability control. The traction control system 51 may command reduced torque production of the engine 26 and/or the electric machines as well as individual wheel braking and torque vectoring in order to increase traction/stability and provide directional control of the vehicle. The traction control system 51 and the ABS 38 may be integrated with each other. The traction control system 51 may utilize the wheel-speed sensors 46 to provide information for traction control among other purposes. The wheel-speed sensors 46 may be coupled directly to the wheels. In some embodiments, the wheel-speed signals may be the output from the anti-lock brake system, an axle sensor, etc.

The traction control system 51 uses, in addition to the wheel-speed sensors 46, the sensor 48. Using the yaw rate sensor, the yaw acceleration may also be determined. The lateral-acceleration sensor outputs a lateral-acceleration signal corresponding to the lateral acceleration of the vehicle body. The longitudinal-acceleration sensor generates a longitudinal-acceleration signal corresponding to the longitudinal acceleration of the vehicle. The various sensors may be directly coupled to various vehicle dynamic control systems, such as a yaw-control system or the rollover stability-control system. A roll-rate sensor may also be used to determine load transfer for the vehicle.

On a conventional vehicle, typical traction control systems increase directional stability and/or tire traction by reducing engine torque and applying the wheel brakes to achieve a desired wheel torque. Engine torque may be reduced by retarding the spark and/or by reducing throttle opening and fuel. Reducing engine torque is sufficient to minimize wheel spin in many situations, however, in certain situations, it is difficult or impossible to reduce engine torque quickly enough to achieve the desired engine-torque reduction. This is particularly true when the desired torque reduction of the engine is greater than that achievable by spark retard. One example of this is accelerating the vehicle from a high traction surface to a low traction surface. In this situation, it is difficult to reduce the powertrain torque output and/or control the powertrain rotating inertia quickly enough to avoid excessive wheel spin and loss of directional control. Stated another way, the engine has a minimum engine torque (sometimes called lowest feasible engine torque) at any instantaneous time, and if the desired engine-torque reduction requires less engine torque than the minimum engine torque, the engine is unable to provide the desired wheel torque alone. Wheel braking can be used to supplement the engine torque reduction, but controlling the wheel torque with the friction brakes can be challenging when the powertrain torque is much greater than available traction at the wheels.

The electric machines 28 and 34 provide opportunities for improved traction control on hybrid and fully electric vehicles as the speeds and torques of electric machines can be controlled more precisely and faster than an internal combustion engine. For example, the electric machines can enter into speed control when excessive slip is sensed to quickly realign the wheel speeds with the vehicle speed. Reducing wheel slip with speed control requires accurate estimation of vehicle speed.

In conventional two-wheel-drive vehicles, vehicle speed can be determined during a slip event by measuring an average wheel speed of the non-driven wheels. On an all-wheel-drive vehicle, all four wheels may be slipping during a slip event and calculating an accurate vehicle speed can be challenging.

Vehicle speed can be calculated based on measurements from the wheel speed sensors 46. Under ideal conditions, i.e., no slip, longitudinal vehicle speed is equal to the average wheel speed. In real life, however, slip frequently occurs between the pavement in one or more of the wheels. In vehicle dynamics, slip ratio is the measure of the relative longitudinal slip at the tire contact patch between the true vehicle speed and the road. Equation 1 formerly defines slip ratio. Where $R_W$ is effective rolling radius of wheel, $\omega_W$ is angular wheel speed, and $V_X$ is longitudinal vehicle speed.

$$\sigma = \frac{R_w \omega_w - V_x}{\max\{R_w, \omega_w, V_x\}} \quad \text{(EQ 1)}$$

Vehicle acceleration measurements from the sensors 48 can be used to correct for inaccurate slip calculations and road grade disturbances. Thus, an advanced vehicle-speed estimation strategy is required in order to obtain accurate estimates of the vehicle speed which can compensate for road grade. This disclosure details methods and controls for accurately calculating vehicle speed to enable precise control of the traction control system 51 and other vehicle systems.

The speed estimation algorithm of this disclosure compensates for road grade and corrects the accelerometer measurements for gravity distortion. The resulting grade compensated accelerometer signals can be fused with the measured wheel speeds to obtain an accurate estimate of the vehicle's longitudinal speed. This estimation algorithm can work for both conventional mechanical all-wheel-drive systems as well as all-wheel-drive systems of hybrid and electric vehicles.

The speed estimation algorithm may utilize three key variables: wheel speeds measured from sensors 46, wheel accelerations derived from the measured wheels speeds, and vehicle longitudinal acceleration measured from sensor 48. The measured wheel speeds may be corrected for yaw rate in order to ensure that the slowest measured wheel speed is accurate. Once the measured wheels speeds have been conditioned and processed, and acceleration offset due to road grade can be calculated based on the difference between wheel acceleration and the measured longitudinal vehicle acceleration. The measured longitudinal vehicle acceleration can be compensated for road grade via a grade offset. Once the vehicle longitudinal acceleration signal has been compensated for road grade, and accurate vehicle longitudinal speed can be estimated. Multiple methods can be used to obtain an estimate of the vehicle speed. For example, a first method applies limits on the slowest measured wheel speed based on the grade compensated vehicle acceleration, and a second method uses numerical integration of the grade compensated vehicle acceleration to obtain the vehicle speed estimate. The algorithm can switch between these two estimation methods based on vehicle measurements.

FIGS. 2 through 5 and the related text describe an example algorithm executed by the one or more controllers 40 to calculate an accurate longitudinal vehicle speed. (For simplicity longitudinal vehicle speed will be referred to a vehicle speed herein.) These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 40. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Referring to FIG. 2, the controller 40 receives speed signals from the wheel speed sensors 46 and performs yaw rate corrections on the speed signals at operation 100. The corrected wheel speeds are outputted from operation 100 and the controller determines the maximum corrected wheel speed at operation 102 and the minimum wheel speed at operation 104. At operation 106 the controller determines the difference between the minimum and maximum speeds (wheel speed delta). The maximum wheel speed 108, the wheel speed delta 110, and the minimum wheel speed 112 are held for use in other calculations of the algorithm.

Referring to FIG. 3, a grade offset calculation 114 by the controller 40 receives as inputs the maximum wheel speed 108, the wheel speed delta 110, and the minimum wheel speed 112 as well as the vehicle longitudinal acceleration signal 116 from the sensor 48. The maximum wheel speed 108 is filtered at operation 118 and passed to differential box 120 where maximum wheel acceleration is determined by taking a derivative of the maximum wheel speed 108. At operation 122 the controller determines if the maximum wheel acceleration is greater than or equal to a threshold. If yes, a flag is issued and sent to operation 124, and if no, a flag is not issued.

The wheel speed delta 110 is filtered at operation 126. Both the filtered and unfiltered wheel speed deltas are passed to operation 128 where the controller determines the maximum value of the two and passes the maximum wheel speed delta value to operation 130. At operation 130 the controller determines if the maximum wheel speed delta is greater than or equal to a threshold. If yes, a flag is issued and sent to operation 124, and if no, a flag is not issued.

The measured longitudinal acceleration of the vehicle 116 is received at operation 132 where the controller determines the absolute value. The absolute value is passed to operation 134 where the signal is filtered and subsequently sent to operation 136. The minimum wheel speed 112 is received at operation 138 where the controller takes a derivative of the minimum speed 112 to determine a minimum wheel acceleration. The wheel acceleration may be filtered at operation 140 and subsequently passed to operation 136. At operation 136 the longitudinal acceleration is subtracted from the minimum wheel acceleration to determine a grade offset, which is an acceleration. Positive grade offset indicates an uphill condition and negative grade offset indicates a downhill condition.

A true/false switch 142 determines whether to use the most recent grade offset or a previous grade offset stored in memory 144. If a flag is output from operation 124, the switch 142 outputs a previous value from the memory 144 as the output grade offset 146. If a flag is not present, the current grade offset is chosen as the outputted grade offset 146.

Figure 4:
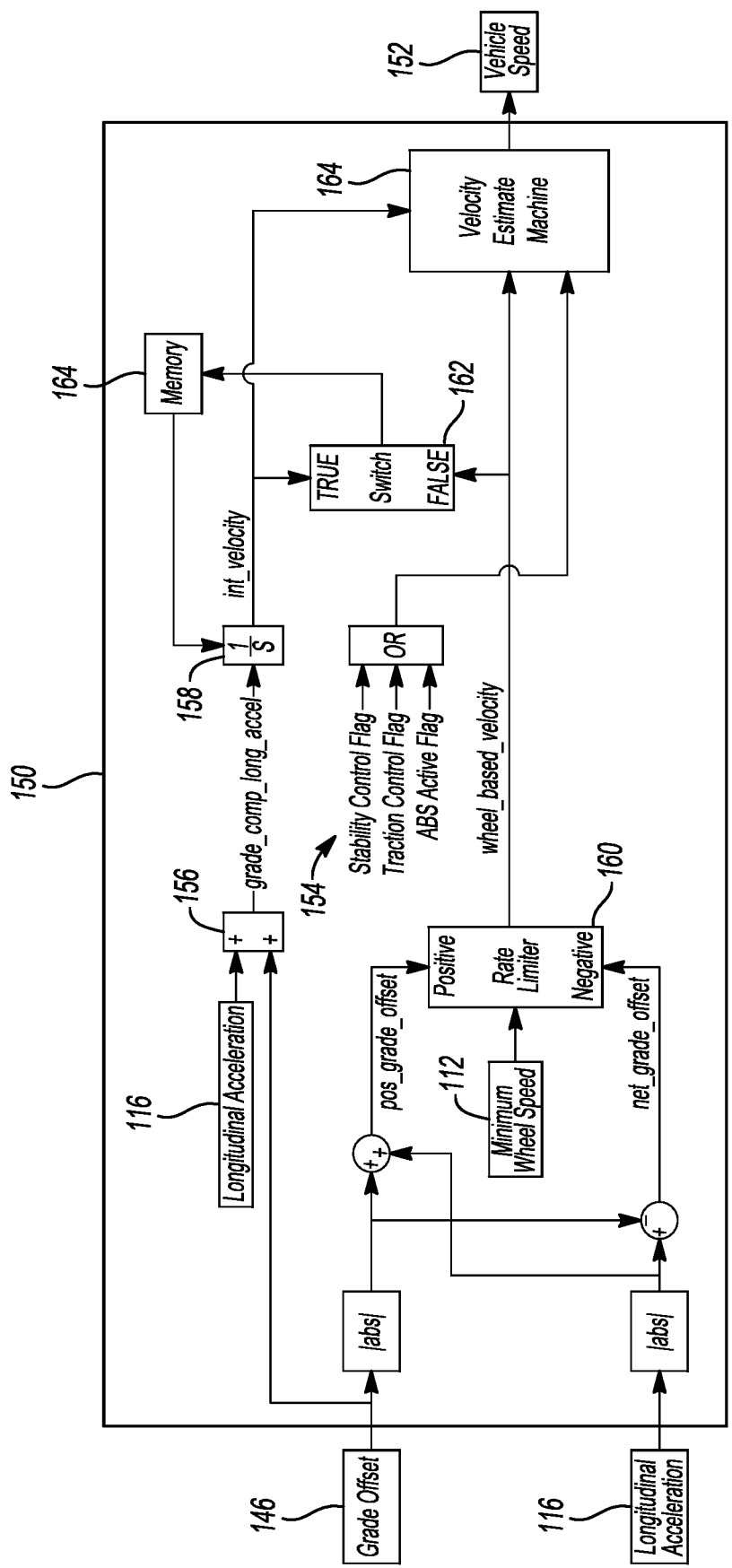
FIG. 4 illustrates a control diagram of the vehicle speed estimation algorithm for calculating the vehicle speed.

Referring to FIG. 4, controls 150 for calculating vehicle speed 152 receive as inputs, the minimum wheel speed 112, the longitudinal acceleration 116, the grade offset 146, and flags 154. The longitudinal acceleration 116 and the grade offset 146 are fed to box 156 where these accelerations are added and sent to integration box 158. The controller integrates the accelerations at block 158 and outputs a calculated integrated vehicle velocity (int_velocity). As will be explained in more detail below, the integrated velocity is used as the vehicle speed 152 when one or more flags 154 are present.

Integrating longitudinal acceleration to determine vehicle speed has a tendency to numerically drift over time. Therefore, the controls 150 normally utilize the minimum wheel speed 112 as the basis to determine vehicle speed unless one or more flags 154 are present. A positive grade offset acceleration (pos_grade_offset) is calculated by adding an absolute value of the grade offset 146 to an absolute value of the longitudinal acceleration. A negative grade offset (neg_grade_offset) is calculated by subtracting an absolute value of the grade offset 146 from an absolute value of the longitudinal acceleration 116. The pos_grade_offset, the neg_grade_offset, and the minimum wheel speed 112 are input into operation 160.

At operation 160, the controller calculates a vehicle velocity based on measured wheel speed (wheel_based_velocity). Positive and negative rate limits are imposed the wheel-based velocity estimate. The positive rate limit is imposed as the measured longitudinal acceleration plus the grade offset. The negative rate limit is imposed as the measured longitudinal acceleration minus the grade offset. These two rate limits ensure that the wheel-based velocity estimate does not accelerate faster than the actual vehicle speed.

A true/false switch 162 receives the int_velocity, the wheel_based_velocity, and the flags 154. The flags 154 may include a stability control flag that is present when the stability control is active, a traction control flag that is present when traction control is active, and an ABS flag that is present when the ABS is active. One or more wheels are frequently slipping during stability, traction, and ABS controls, and, as such, the minimum wheel speed 112 may be inaccurate. Thus, the switch 162 outputs the integrated velocity to memory 163 when a flag is present (true) and outputs the wheel_based_velocity when a flag is not present (false). The output of block 162 is stored in memory 163 for use during future integrations at operation 158. The velocity estimation machine 164 receives the flag status, the int_velocity, and the wheel_based_velocity and outputs a calculated vehicle speed 152.

Figure 5:
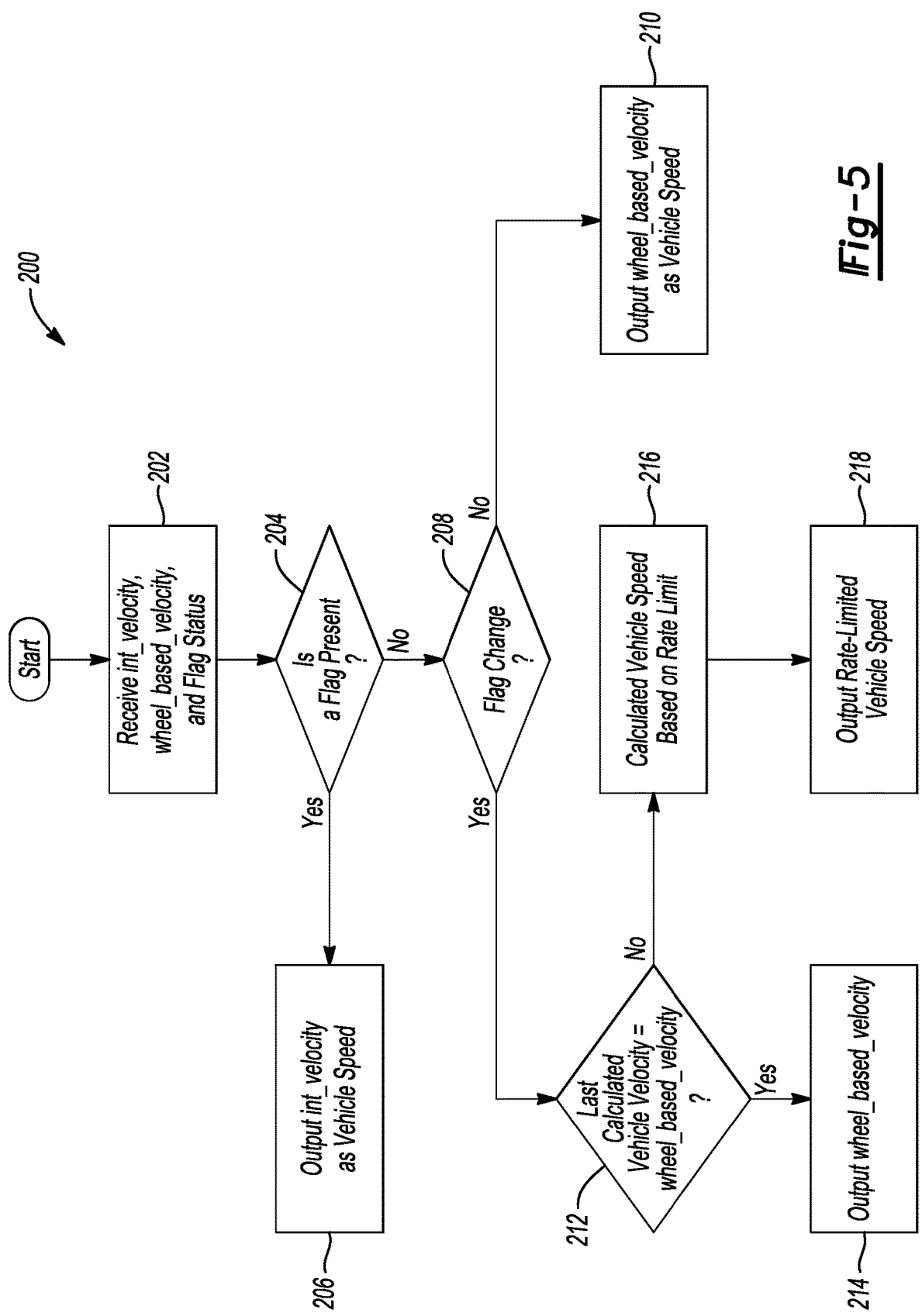
FIG. 5 is a flow chart illustrating logic of a velocity estimate machine.

Referring to FIG. 5, the handoff between the two velocity estimates (int_velocity, and the wheel_based_velocity) is handled by the velocity estimate machine 164. The machine 164 monitors the two velocities along with the integration flags. The machine 164 is configured to choose which of the velocities to use and ensures a smooth linear ramp transition when switching between the velocities in response to changes in the flag status.

The flowchart 200 illustrates example controls of the velocity estimate machine 164. At operation 202, the machine 164 receives the flag status, the int_velocity, and the wheel_based_velocity. Machine 164 determines if a flag(s) is present at operation 204. If yes, control passes to operation 206 and the machine outputs the int_velocity as the vehicle speed 152. If no, control passes to operation 208. At operation 208, the machine 164 determines if any of the flag statuses have changed. If no, control passes to operation 210 and the wheel_based_velocity is output as the vehicle speed 152.

If the flag status has changed, control passes to operation 212 to determine if the last calculated velocity was equal to the wheel_based_velocity. If yes, the machine 164 outputs the wheel_based_velocity as the vehicle speed 152 as rate limiting is not required. If no, control passes operation 216 and the machine calculates a vehicle speed based on a rate limit. The wheel_based_velocity and the int_velocity may have different values and, as such, the rate limit is applied to the output vehicle speed 152 to prevent a large step in the adjacent calculated vehicle speeds. At operation 216, the vehicle speed may be calculated by equation 2. The rate limited vehicle speed is output at operation 218.

vehicle speed=(last vehicle speed)+[(wheel_based-_velocity−last vehicle speed)×rate limit]   (EQ 2)

The calculated vehicle speed 152 may be used by a host of other vehicle systems to control operation of the engine 26, the electric machines 28, 34, the ABS 38, and the traction control system 51. For example, the traction control system 51 may control wheel slip by entering one or more of the electric machines into speed control. During speed control, the controller 40 commands a speed target for the electric machines to accelerate or decelerate the wheels to reduce slip. Reducing wheel slip by speed controlling electric machines requires an accurate estimate of vehicle speed, which the calculated vehicle speed 152 provides.

Figure 6:
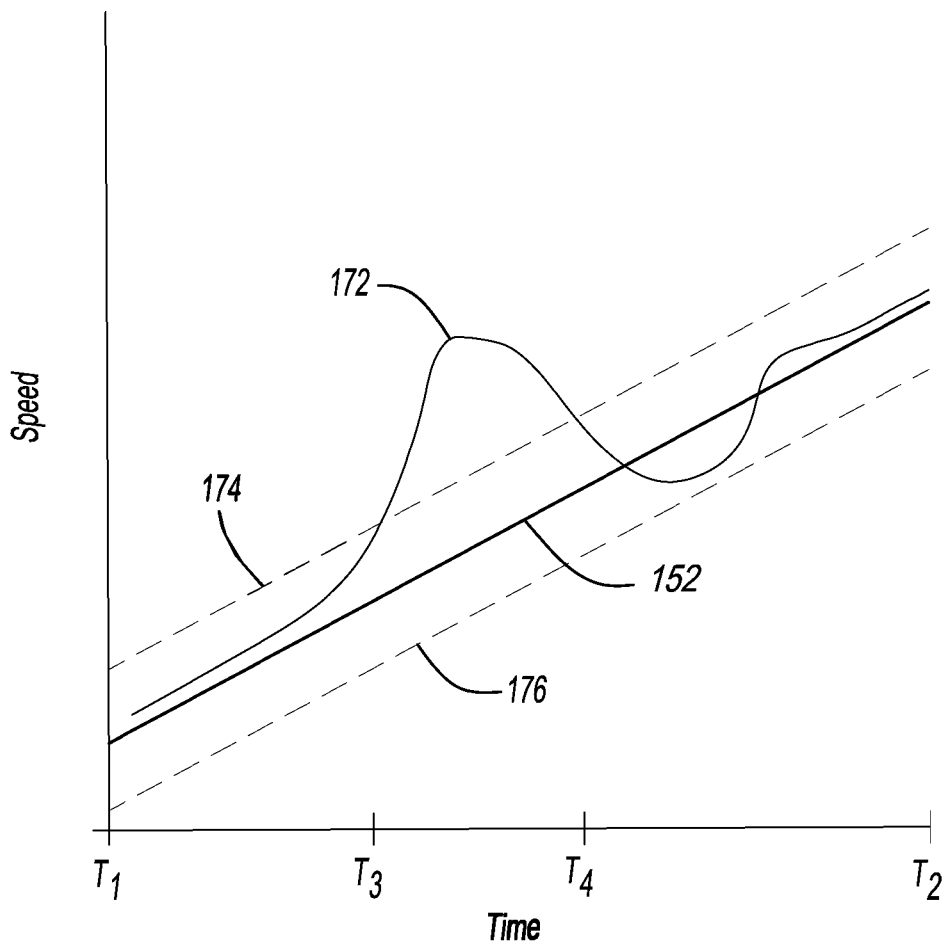
FIG. 6 are plots showing longitudinal vehicle speed and longitudinal wheel speed of a vehicle during an example sampling of a drive cycle.

FIG. 6 illustrates plots of vehicle speed 152 and wheel speed 172 of the rear axle 24 between times $T_1$ and $T_2$. The wheel speed 172 may be an average speed of the rear wheels 32 and 33 converted from angular velocity to longitudinal velocity using equation 3. Where $\omega_{RW}$ and $\omega_{LW}$ are right and left wheel speeds and $R_W$ is effective rolling radius.

$$\text{Longitudinal Wheel Speed} = \left[\frac{\omega_{RW} + \omega_{LW}}{2}\right] R_W \quad \text{(EQ 3)}$$

The controller may default to torque control of the electric machine. In torque control, the controller commands a torque to the electric machine based on a driver-demanded torque and a motor torque split. Driver-demanded torque may be based on position of an accelerator pedal. The vehicle may include an aggregator that divides driver-demanded torque among the vehicle's electric machine(s) and engine (if equipped) and determines the torque split to be commanded to the electric machine.

The controller may be programmed to speed control the electric machine 34 when the wheel speed 172 exceeds an upper threshold 174 or a lower threshold 176. The thresholds 174, 176 are based on the calculated vehicle speed 152. For example, the threshold may be between 4 to 8 kilometers per hour above and below the speed 152. This range is merely an example and the thresholds are a calibratable value that may vary depending upon the specific design of the vehicle.

At time $T_3$ the wheel speed 172 exceeds the upper threshold 174 indicating excessive slip. In response, the controller 40 may enter into speed control for the electric machine 34 to reduce the slip and converge the wheel speed 172 towards the vehicle speed 152. During speed control, the controller sets a speed target for the electric machine and using a proportion-integral (or portion-integral-derivative) controller controls the electric machine to that speed. Applicant co-pending application Ser. No. 16/117,459, filed Aug. 30, 2018, describes speed control in more detail and is incorporated by reference herein in its entirety. The target speed is based on the vehicle speed 152 and a speed ratio between the electric machine 34 and the wheels 32, 33. For example, the target speed may be calculated using equation 4.

$$\text{target speed} = \frac{V_x}{R_w} \times \text{speed ratio} \quad \text{(EQ 4)}$$

At time $T_4$, speed control has successfully reduced the wheel speed 172 below the upper threshold 174 and the speed difference between the wheels and the vehicle continue to converge towards times $T_2$. At time $T_2$, the wheel speed has converged to the vehicle speed 152, and the controller may exit speed control of the electric machine and resume torque control. The speed-difference threshold for exiting speed control may be the same as entering speed control, e.g., 174 and 176, or may be a tighter threshold.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an all-wheel-drive powertrain including an electric machine configured to power wheels; and
   a controller programmed to
      output a first calculated vehicle speed derived from integrating a measured longitudinal acceleration of the vehicle,
      output a second calculated vehicle speed based on the measured longitudinal acceleration and a speed of one of the wheels,
      responsive to a flag being present, command a speed to the electric machine that is based on the first vehicle speed to reduce wheel slip, and
      responsive to a flag not being present, command a speed to the electric machine that is based on the second vehicle speed to reduce wheel slip.

2. The vehicle of claim 1, wherein the second vehicle speed is further based on a grade offset acceleration.

3. The vehicle of claim 2, wherein the grade offset acceleration is derived from a difference between acceleration of the wheels and the measured acceleration of the vehicle.

4. The vehicle of claim 1 further comprising, responsive to speed being commanded to the electric machine based on the first vehicle speed and a flag not being present, command a speed to the electric machine such that an acceleration of the electric machine is less than a threshold.

5. The vehicle of claim 1, wherein the flag is indicative of at least one of a traction control event, a stability control event, or an anti-lock braking system event.

6. The vehicle of claim 1, wherein the powertrain further includes a second electric machine, a front axle powered by one of the electric machines, and a rear axle powered by the other of the electric machines.

\* \* \* \* \*